Sept. 17, 1957 P. DÖRFEL 2,806,497
MACHINE FOR CUTTING AND MIXING FOODS
Filed Aug. 17, 1955 5 Sheets-Sheet 1

INVENTOR
PAUL DÖRFEL

Sept. 17, 1957 P. DÖRFEL 2,806,497
MACHINE FOR CUTTING AND MIXING FOODS
Filed Aug. 17, 1955 5 Sheets-Sheet 2

INVENTOR
PAUL DÖRFEL

Sept. 17, 1957  P. DÖRFEL  2,806,497
MACHINE FOR CUTTING AND MIXING FOODS
Filed Aug. 17, 1955  5 Sheets-Sheet 3

INVENTOR
PAUL DÖRFEL
BY *Leon M. Straus*
AGT

Sept. 17, 1957  P. DÖRFEL  2,806,497
MACHINE FOR CUTTING AND MIXING FOODS
Filed Aug. 17, 1955  5 Sheets-Sheet 4

INVENTOR
PAUL DÖRFEL

Sept. 17, 1957 P. DÖRFEL 2,806,497
MACHINE FOR CUTTING AND MIXING FOODS
Filed Aug. 17, 1955 5 Sheets-Sheet 5

INVENTOR
PAUL DÖRFEL

United States Patent Office 2,806,497
Patented Sept. 17, 1957

2,806,497

MACHINE FOR CUTTING AND MIXING FOODS

Paul Dörfel, Stuttgart, Germany

Application August 17, 1955, Serial No. 528,880

Claims priority, application Germany August 19, 1954

6 Claims. (Cl. 146—67)

The invention relates to a machine for working foodstuffs, which machine is provided with a container for receiving said foods or like material, and is equipped with tools, e. g. knives, rotating in it; the invention more particularly relates to noiseless cutters.

The invention concerns specifically a machine comprising at least two tool shafts, mounted in overhung relation, and having free ends carrying tools, i. e. cutting and mingling tools each working the material within the container in a different way.

The advantage of the new machine consists in that different working processes can be carried out simultaneously and by means of a single machine. As the different tool-carrying shafts are mounted to overhang a container for the foods more free space is available and consequently the tools, e. g. a mingling tool and a cutting tool, can be arranged opposite each other so that the effect of the tools on the material to be worked upon overlaps in certain sections.

According to one embodiment of the invention the tool shafts are mounted in an easily interchangeable working device, forming a self-contained, structural unit, and are preferably driven independently of each other.

According to another embodiment of the invention a cutting tool is secured to one overhung tool shaft, and a mingling tool to another tool shaft.

The latter embodiment can be modified so that the mingling tool and the cutting tool are axially aligned and so located that the material to be worked, particularly that accumulating on the inner wall of its container, is brought into contact with the working tools.

Such an arrangement permits the production of paste-like material as well as material cut into cubes or pieces without the necessity of exchanging tools. In order to produce paste-like material, the mingling tool is driven so that it rotates in the opposite direction to the knives. Consequently, the material moving with the rotating container is banked up even more in front of the mingling tool, thus permitting the knives to act upon it for a longer time; the material is reduced to the finest particle size. When the material is to be cut into cubes, the mingling tool rotates in the same direction as the knives, so that the cut material is removed by the mingling tool. The volume of material banked up or of the additional carrying capacity can be regulated at discretion by changing the rotary speed of the mingling tool shaft. The rotary speed of the cutter shaft can also be adjusted. For the sake of expediency the mingling tool is removably mounted on the shaft so that it can easily be replaced by a mingling device of a different form or by any other tool.

According to a still further embodiment of the invention the mingling tool is formed like a wheel with propeller blade-type wings; in another embodiment the mingling tool is of helical shape.

Preferably the tools secured to the overhung tool shafts are interchangeable and can be replaced by other working tools.

A very advantageous embodiment of the invention relates to a silent cutter. In this embodiment the cutter shaft is mounted overhung, and is hollow. Within it another shaft is mounted, carrying another tool, i. e., a mingling tool, and this shaft is driven independently of the drive of the hollow shaft.

According to a further embodiment of the invention at least one working device must be arranged so that it can be pivoted to a position above the container; preferably this pivoted movement is dependent on the pivotal movement of the cover.

According to a still further embodiment of the invention, one working device is provided with an ice milling cutter from which the comminuted ice falls directly into the container where it mingles with the material there.

It is an object of the present invention to provide a machine for working foods in which a multiplicity of operations conventionally applied to such food may be performed simultaneously.

It is another object of the present invention to provide a machine for working foods which works the food in a more thoroughly and efficient manner than any similar machine.

It is a further object of the present invention to provide a machine for working foods in which the cutting operations will be accomplished at a relatively low sound level.

These and other objects and features of advantage of the present invention will become more apparent when considered in connection with the accompanying drawings, in which.

Figure 15:
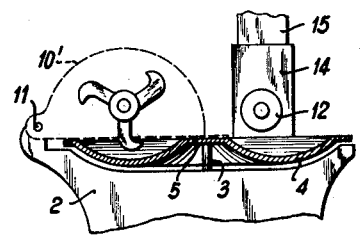
Figure 16:
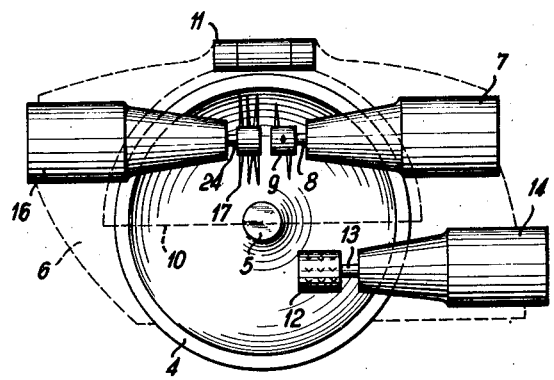
Figure 17:
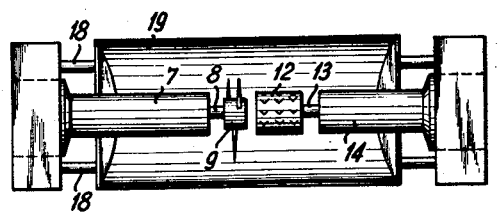

Figs. 7 and 8, 9 and 10, 11 and 12, 13 and 14, 15 and 16 are front views and plan views, respectively, of further embodiments of the invention, and Fig. 17 shows the invention as applied to another machine for working foods.

Figure 1:
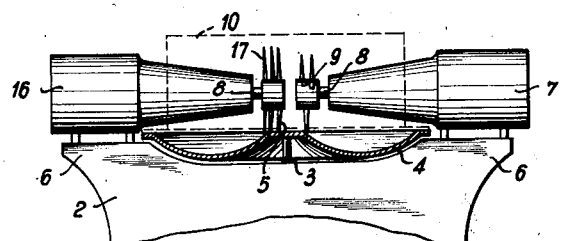
Fig. 1 is a front view of a fragmentary section of one embodiment of the invention.
Figure 2:
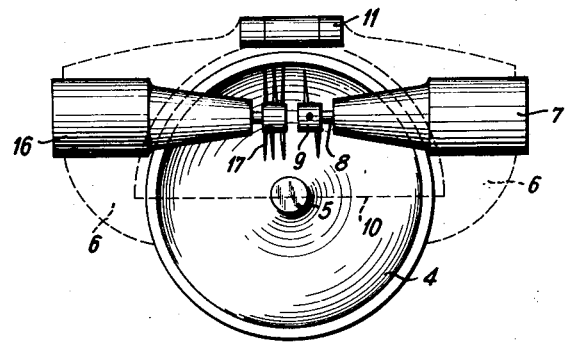
Fig. 2 is a plan view with the cover removed.
Figure 3:
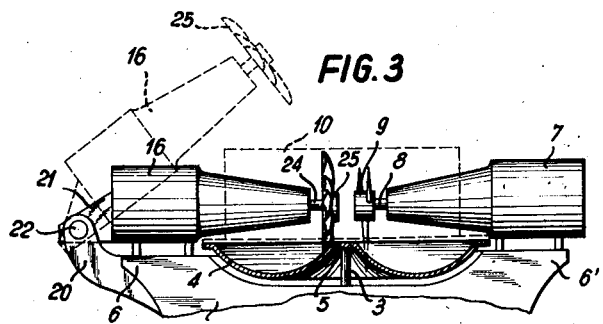
Figs. 3 and 4 are a front view and plan view of a still further embodiment of the invention.
Figure 4:
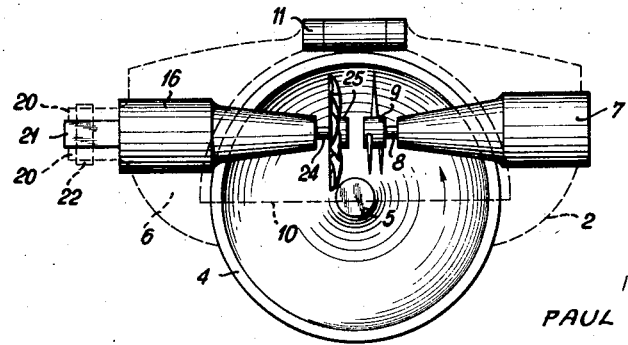
Figure 5:
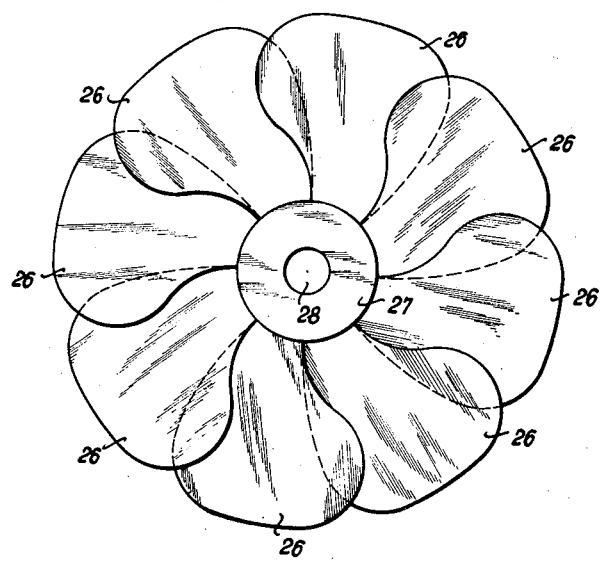
Figs. 5 and 6 illustrate a mingling device on an enlarged scale.
Figure 6:
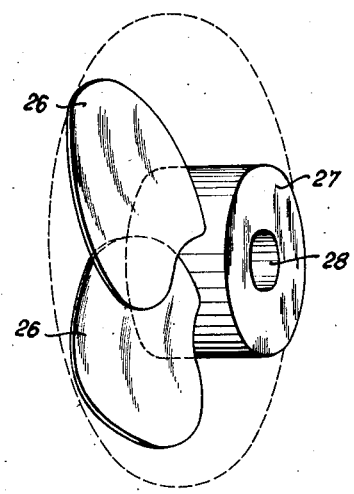

Referring now to Figs. 1 and 2, the drive shaft 3 for the rotatable container 4 is mounted on the support 2. The shaft 3 engages and extends into the central elevated portion 5 of the container 4. A housing 7 is detachably arranged on a table-like projection 6 on one side of the support 2. The drive shaft 8 is housed therein and carries the cutting head 9 secured, e. g., by set screws. A motor (not shown) is mounted within the cutter housing 7. The housing 7 may be movable and adjustable in its entirety along projection 6 in the direction of the shaft 8 by conventional means.

Its height can also be made adjustable by conventional means, if desired, so that the container 4 can easily be emptied and cleaned. The embodiment according to Figs. 1 and 2 shows a cutting head 9 arranged opposite a mingling head 17 carried by a tool-carrying shaft 8a mounted to overhang the container 4. The mingling head 17 is interchangeably secured to the shaft 8a, which is arranged within the housing 16. The worm 17 and the cutter head 9 are covered by the cover 10 which is pivotally mounted on an axle 11 for upward movement.

In another embodiment according to Figs. 3 to 6 the housing 16 is supported by another table-like projection 6. The projection 6 is provided with two parallel supports 20, and the foot 21 of the housing 16 projects between the supports 20. Supports 20 and foot 21 are connected by a horizontal axle 22, so that the housing 16 on the axle 22 can be swivelled out of the container 4. The cutter head 9 and the mingling head 25 are enclosed by the cover 10 indicated by broken lines in operational position, whereas the broken lines 16 indicate the swivelled position of the mingling housing 16.

In the embodiments according to Figs. 3 to 14 the mingling housing 16 carries on its driving shaft 24 a mingling head 25 which is formed like a propeller wheel. According to Figs. 5 and 6 the mingling head 25 consists of a hub 27 which carries the propeller blade-type wings 26. The outer radial parts of adjacent blades 26 overlap in axial direction. Bore 28 is adapted to receive the shaft 24.

In operational position the mingling housing 16 is positioned so that the blades 26 of the mingling head 25 sweep along the outer and inner edges of the container 4 seizing the material to be worked and mingling it with the rest. Previously that part of the material accumulated at the inner walls of the container 4 had to be placed in cutting position by hand.

Figure 7:
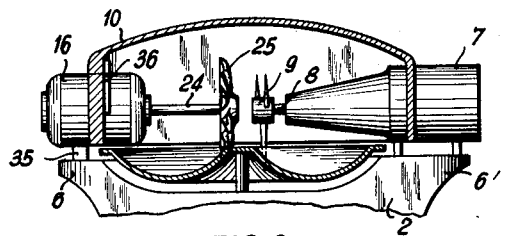
Figure 8:
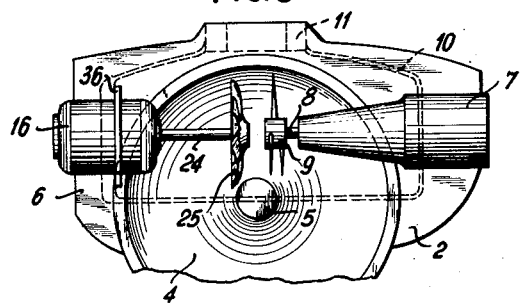

In the embodiment according to Figs. 7 and 8 the mingling housing 16 is provided with a flange 36 extending over half of its outer surface. This flange and screws (not shown) detachably secure the mingling housing 16 to a vertical part of the cover 10 of the machine, which in addition covers the cutting housing 7 and about half of the rotatable container 4. When the cover 10 is pivoted upwardly, the mingling housing 16 is swivelled away from the container 4. In addition, a buffer 35 is affixed to the underside of the housing 16, which buffer rests on the projection 6 of the support 2 when the cover 10 is tilted downwards, supporting the mingling housing 16 and the cover 10.

Figure 9:
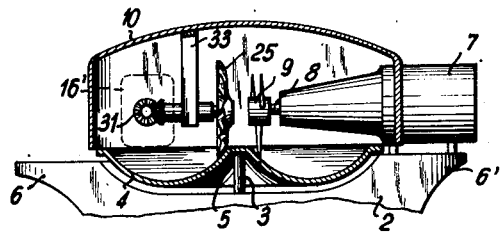
Figure 10:
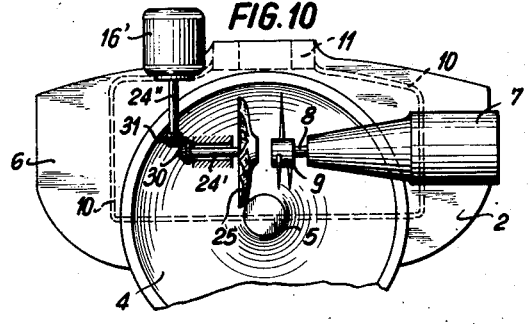

The arrangement according to Figs. 9 and 10 illustrates a machine similar in its structure to the machine according to Figs. 7 and 8, and shows the mounting of a mingling device on the pivotable cover 10 of an already finished machine.

Within the cover 10 of the machine according to Figs. 9 and 10 a shaft 24' carrying the propeller wheel 25 is rotatably mounted by means of a bearing block 33. In Fig. 10 the left-hand end of the shaft 24' carries a bevelled wheel 30. A shaft 24" of a motor 16' is provided on its free end with a bevelled wheel 31 which meshes with the bevelled wheel 30 of the shaft 24' carrying the propeller wheel or mingling head 25. The motor 16' is suitably fixed outside the cover 10 and on it, with the centre of gravity of the motor being near the axle 11 of the cover 10.

The shaft 24' may be formed so that the propeller wheel 25 can be replaced by another working tool or head, e. g., by another cutting tool. The same applies to the design of the machine according to Figs. 7 and 8. Instead of only replacing tools, preferably the whole working device is replaced by another, which can be done easily and quickly by loosening the screws penetrating the flange 36.

Figure 11:
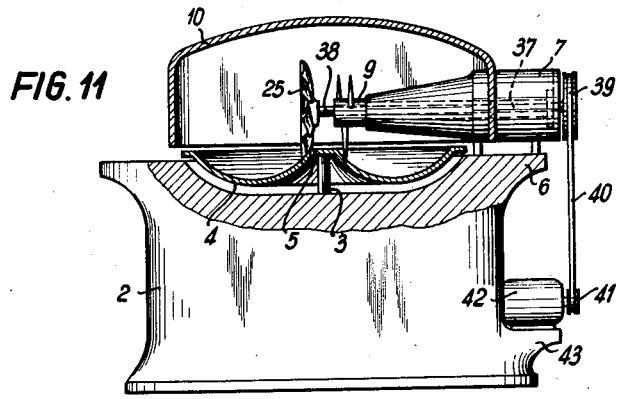
Figure 12:
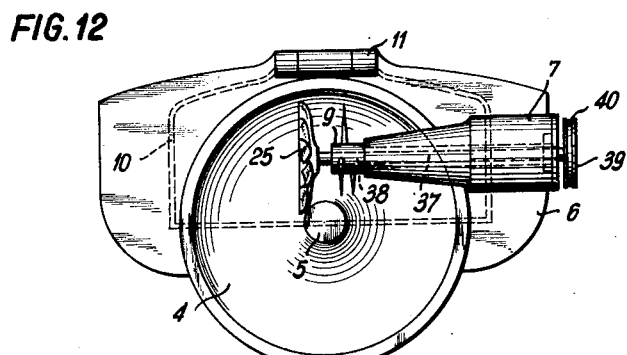
Figure 13:
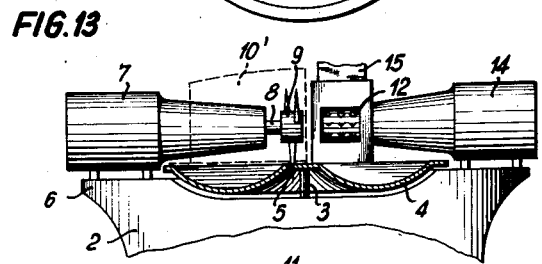
Figure 14:
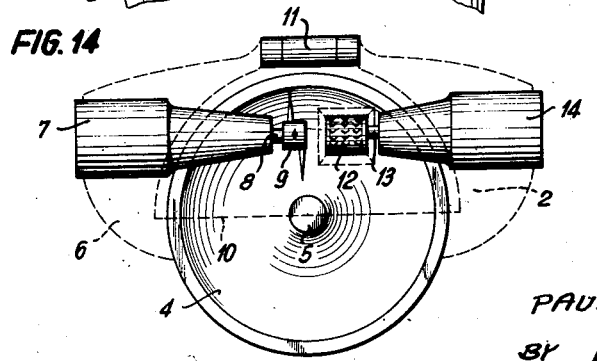

In the embodiment as illustrated in Figs. 11 and 12, the cutting housing 7 is provided with a hollow shaft 37, driven by a motor situated within the housing 7 and carrying on its free end the cutter head 9. Within the hollow shaft 37 a shaft 38 is rotatably mounted and on its free end carries the mingling tool 25. A pulley 39 rests on the opposite end of the shaft 38 which is connected by a belt with a pulley 41 of a motor 42.

The motor 42 is fixed on a projection 43 of the support 2 and allows clockwise and counter-clockwise rotation as well as speed control, so that the mingling tool 25 may rotate either in the same or in the opposite direction as the cutting knives 9. The tools 25 and 9, together with approximately half of the rotating container 4 beneath them, are shielded by the cover 10. The rotary speed of the mingling tool shaft 38 can either be controlled by the motor 42 or by means of a gear.

In the embodiment according to Figs. 13 to 16 the machine, besides having the cutting means 7, is provided with a housing 14, carrying an ice milling cutter. The shaft 13 is mounted in the housing 14. The shaft 13 on its free end supports a milling drum 12 provided with teeth. The shaft 13 is driven by a motor, independent from the driving motor for the housing 7. The ice block 15, which is to be comminuted, is introduced from above (Fig. 13) and during the working process the comminuted ice arrives at the container 4 and mingles with the material therein. In this embodiment the cover 10' only covers the cutter head 9 and the part of the container 4 beneath it, however, not the ice milling cutter 12. In another embodiment (Fig. 14) however, the cover 10 covers both the cutter head 9 and the milling drum 12. In this case, parts containing the opposed surfaces for the milling drum 12 are secured to the cover 10.

In the embodiment according to Figs. 15 and 16 three tool shafts 13, 8, 24 are mounted in housings 7, 14 and 16, these housings being self-contained, structural units. The shaft 8 carries a cutter head 9, the shaft 25 a mingling head 17 and the shaft 13 a milling drum 12. In Fig. 17 the invention has been applied to a machine for working foods in which a drum 19 is movably guided along rods 18 beneath the housings 7 and 14.

The mingling tools can also be provided with two blades. Their angle of incidence may be chosen so that it increases from the hub to the blade end. Preferably, the blade end is tangentially bent and the bent part is tapering. Preferably the mingling wheel and the cutting tools are arranged so that the mingling wheel pushes the material, particularly that accumulating on the inner wall of the container, into the cutters of the cutting tools or causes either suction or banking up of the material within the range of the cutting tools, depending on its rotary speed.

According to the purpose of the machine, the mingling tool is arranged in the direction of the movement of the container either before or behind the cutting tools. In all embodiments the tools described above can be replaced by others.

It will be apparent that the alterations, modifications and substitutions may be made in the above description without departing from the scope of the invention. It is desired, therefore, that the invention be limited solely by the following amended claims.

Having thus described the invention, what is claimed as new and desired to be secured by Letters Patent, is:

1. In a machine for the cutting and mixing of foodstuffs; a bowl rotatable about a fixed vertical axis, a pair of coaxial spindles overlying said bowl and having their axes lying in a plane substantially normal to said vertical axis of the bowl, propeller-shaped mixing blade means connected to one of said spindles, cutting means connected to the other of said spindles, and independent means for driving said spindles, respectively, to thereby facilitate relative rotation of said blade means to said cutting means.

2. In a machine according to claim 1, said bowl being toroidal in shape, one of said shafts being hollow, the other shaft projecting axially through said hollow shaft for exposure therebeyond, said shafts overlying said bowl laterally of said vertical axis.

3. A machine according to claim 1, said mixing blade means and cutting means projecting into said bowl to cut and mix said foodstuffs therein, said blade means being adapted to feed said foodstuffs toward said cutting means, said shafts being axially aligned and being disposed in spaced relation to each other.

4. In a machine according to claim 1, said blade means and said cutting means being positioned within a single quadrant of a circle formed by the mouth of said bowl.

5. In a machine according to claim 1, including a cover arranged for movement to and from said bowl, at least said blade means being attached to said cover and being movable with said cover.

6. In a machine for cutting and mixing food materials;

a toroidal bowl rotatable about a fixed vertical axis, a pair of coaxial, horizontally supported and rotatable spindles overlying said bowl and spaced from and disposed at one side of said vertical axis, the axes of said spindles lying in a plane substantially normal to said vertical axis, mixing blade means on one of said spindles, cutting means on the other spindle, and independent drive means for said blade means and said cutting means, respectively, to rotate same relative to each other and in planes substantially parallel to said vertical axis.

References Cited in the file of this patent

UNITED STATES PATENTS

| | | |
|---|---|---|
| 1,655,785 | Guelden | Jan. 10, 1928 |
| 1,850,199 | Bryant | Mar. 22, 1932 |
| 2,245,012 | Robinson | June 10, 1941 |

FOREIGN PATENTS

| | | |
|---|---|---|
| 705,517 | France | June 9, 1931 |
| 678,174 | Germany | July 10, 1939 |
| 733,298 | Great Britain | July 6, 1955 |